United States Patent
Handshaw et al.

(10) Patent No.: US 8,740,086 B2
(45) Date of Patent: *Jun. 3, 2014

(54) APPARATUS FOR AND METHOD OF READING INDICIA BY USING NON-READILY VISIBLE ILLUMINATION LIGHT

(75) Inventors: Darran M. Handshaw, Sound Beach, NY (US); Mark E. Drzymala, St. James, NY (US); Eric S. Trongone, West Babylon, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/466,264

(22) Filed: May 8, 2012

(65) Prior Publication Data

US 2013/0299581 A1    Nov. 14, 2013

(51) Int. Cl.
*G06K 7/10* (2006.01)
*G06K 7/12* (2006.01)

(52) U.S. Cl.
USPC ...... 235/470; 235/440; 235/454; 235/462.14; 235/462.42

(58) Field of Classification Search
CPC .......... G06K 7/10722; G06K 7/10732; G06K 7/10564; G06K 7/10574; G06K 7/10584; G06K 7/10831

USPC ............... 235/440, 454, 462, 14, 462.42, 470
See application file for complete search history.

(56) References Cited

U.S. PATENT DOCUMENTS

| | | | |
|---|---|---|---|
| 6,462,880 B1 * | 10/2002 | Ohkawa et al. | 359/629 |
| 6,866,197 B1 * | 3/2005 | Detwiler et al. | 235/462.39 |
| 8,313,033 B1 * | 11/2012 | Vinogradov et al. | 235/470 |
| 2002/0139856 A1 * | 10/2002 | Barkan | 235/462.4 |
| 2004/0056099 A1 * | 3/2004 | Barkan | 235/462.39 |
| 2005/0199719 A1 * | 9/2005 | Hepworth et al. | 235/454 |
| 2006/0249584 A1 * | 11/2006 | Bobba et al. | 235/462.39 |
| 2010/0116887 A1 * | 5/2010 | Barkan et al. | 235/440 |
| 2010/0264219 A1 * | 10/2010 | He et al. | 235/454 |
| 2010/0327060 A1 * | 12/2010 | Moran et al. | 235/440 |
| 2011/0132985 A1 * | 6/2011 | McQueen et al. | 235/454 |
| 2013/0082104 A1 * | 4/2013 | Kearney et al. | 235/383 |

* cited by examiner

*Primary Examiner* — Thien M Le
*Assistant Examiner* — Claude J Brown
(74) *Attorney, Agent, or Firm* — Nong-Qiang Fan

(57) ABSTRACT

Infrared light, which is non-readily visible, illuminates at least part of a field of view containing indicia to be electro-optically read. Visible light illuminates another field of view containing the same indicia. The indicia is read by image capture by the illumination light from one of the illuminated fields of view. The use of IR light minimizes an adverse reaction due to only using bright visible light. The use of visible light enables thermally printed indicia, which is not readily readable by IR light, to be read.

10 Claims, 3 Drawing Sheets

APPARATUS FOR AND METHOD OF READING INDICIA BY USING NON-READILY VISIBLE ILLUMINATION LIGHT

FIELD OF THE DISCLOSURE

The present disclosure relates generally to an apparatus for, and a method of, electro-optically reading indicia by image capture and, more particularly, to illuminating at least one field of view, from among a plurality of fields of view in which the indicia is contained, with non-readily visible light to counteract any adverse bothersome reaction of operators, customers, or others in the vicinity of the apparatus, due to illuminating the indicia only with annoyingly bright, intense, visible illumination light.

BACKGROUND

Solid-state imaging apparatus or imaging readers, that have been configured either as a handheld, windowed, portable scanner; a stand-mounted, windowed, stationary scanner; a countertop-mounted, vertical slot scanner having a generally vertical or upright window; a flat-bed or horizontal slot scanner resting on, or built into, a countertop and having a generally horizontal window; or a bi-optical, dual window, scanner having both generally horizontal and generally vertical windows; have been used as workstations in many venues, such as supermarkets, department stores, and other kinds of retailers, libraries, parcel deliveries, as well as factories, warehouses and other kinds of industrial settings, for many years, in both handheld and hands-free modes of operation, to electro-optically read by image capture diverse indicia or targets, such as symbol targets, e.g., one-dimensional symbols, particularly Universal Product Code (UPC) bar code symbols, and two-dimensional symbols, as well as non-symbol targets, such as driver's licenses, receipts, signatures, etc., the indicia being associated with, or borne by, objects or products to be processed by the imaging readers. In the handheld mode, a user, such as an operator or a customer, held the imaging reader and manually aimed a window thereon at the indicia. In the hands-free mode, the user slid or swiped a product associated with, or bearing, the indicia in a moving direction across and past a window of the reader in a swipe mode, or momentarily presented the indicia associated with, or borne by, the product to an approximate central region of the window, and steadily momentarily held the indicia in front of the window, in a presentation mode. The choice depended on the type of the reader, or on the user's preference, or on the layout of the venue, or on the type of the product and the indicia.

The imaging reader included one or more solid-state imagers (also known as imaging sensors). Each imaging sensor included a sensor array of photocells or light sensors (also known as pixels), which corresponded to image elements or pixels over a respective field of view of the imaging sensor, an illumination assembly including one or more visible (red/white) light sources, e.g., light emitting diodes (LEDs), for illuminating the respective field of view with visible illumination light, and an imaging lens assembly for capturing return ambient and/or visible illumination light scattered and/or reflected from the indicia contained in the respective field of view, and for projecting the return light onto the imaging sensor to initiate capture of an image of the indicia. For workstations having multiple imaging sensors and multiple fields of view, the indicia often was simultaneously contained in more than one field of view during reading. The imaging sensor was advantageously configured as a one- or two-dimensional charge coupled device (CCD) or a complementary metal oxide semiconductor (CMOS) device, and included associated circuits for producing and processing an electrical signal corresponding to the indicia. The imaging sensor was controlled by a controller or programmed microprocessor that was operative for processing the electrical signal into information indicative of the indicia being imaged and read, and when the indicia was a symbol, for decoding the symbol.

The aforementioned illumination assembly was especially advantageous when the reader was operated in low light or dark environments. Yet, the use of visible (white/red) illumination light, either emitted continuously or pulsed, was sometimes perceived to be too annoyingly bright and bothersome to some operators, customers, their children, or their pets. During the swipe mode when the white/red LEDs were always on, the constant white/red illumination light was sometimes regarded as being unpleasant to some operators who were exposed to such bright white/red light for extended time periods during a work shift, thereby making the operators uncomfortable with such long term exposure to their eyes. When the white/red LEDs were pulsed, it was usually overdriven with a high drive current to produce an intensely bright white/red illumination light, again making the operators and others uncomfortable.

Accordingly, it would be desirable to counter the adverse reaction to such bright light by such techniques as driving the white/red illumination LEDs with lower drive currents, or changing their duty cycles, or using light baffles, or using different illumination sources having lower intensities and/or of different wavelengths. However, each of these techniques was problematic.

For example, some light sources were less effective in reading certain indicia, such as a bar code symbol, whose contrast varied as a function of the wavelength of the light illuminating the symbol. As used herein, the term "contrast" is defined as the difference in reflectivity/scattering properties between a symbol's bars, which are typically printed dark in color, e.g., black or blue ink, (low reflectivity), and the symbol's spaces, which are typically white in color (high reflectivity). Thus, a symbol printed with thermal ink, typically blue in color, on thermochromic paper was well detectable in white or red visible light, but was hardly, or not readily, detectable in light having a higher wavelength, e.g., infrared (IR) light. Employing IR light, which, depending on such factors, among others, as wavelength, is non-readily visible, or semi-visible, or, in some cases, invisible, to the human eye, could ameliorate the above-described adverse reaction to bright visible light, but with the drawback of not being able to effectively read thermally printed symbols. However, there are many applications where such thermally printed symbols are used. For example, delicatessen counters in supermarkets routinely thermally print symbols on labels for meat/cheese products that have been cut and weighed to order, and it is critical that such thermally printed symbols be effectively readable at point-of-transaction workstations at checkout in retail establishments, such as supermarkets.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
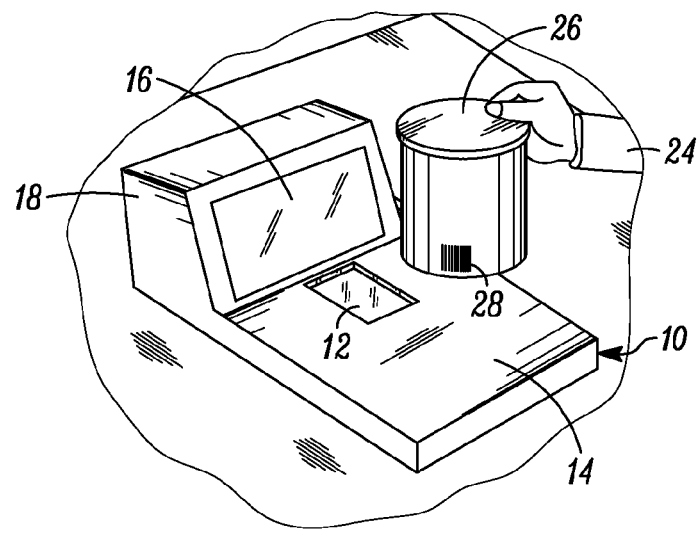
FIG. 1 is a broken-away, perspective view of a dual window, bi-optical, point-of-transaction workstation or reader operative for reading indicia by image capture in accordance with this invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An apparatus, in accordance with one aspect of this invention, is operative for electro-optically reading indicia, and includes a housing; a plurality of solid-state imagers supported by the housing, and operative for looking at each indicium over a plurality of fields of view; and an illumination assembly supported by the housing, and operative for illuminating the indicia. The illumination assembly includes a first energizable light source for emitting non-readily visible illumination light to illuminate at least one of the fields of view in which a respective indicium is contained, and a second energizable light source for emitting visible illumination light to illuminate at least another of the fields of view in which the respective indicium is contained. The imagers are further operative for capturing at least one of the non-readily visible illumination light and the visible illumination light returning from the respective illuminated indicium, and for generating a signal corresponding to the respective illuminated indicium. A controller is operative for energizing at least one of the light sources to emit the illumination light, for controlling at least one of the imagers to capture the returning illumination light, and for processing the signal to read the respective illuminated indicium.

It is known that the visible spectrum is the portion of the electromagnetic spectrum that is visible to (can be detected by) the human eye. A typical human eye will respond to wavelengths from about 390 nm to about 750 nm. Electromagnetic radiation in this range of wavelengths is called "visible light". Infrared (IR) light is electromagnetic radiation with longer wavelengths than those of visible light, extending from the nominal red edge of the visible spectrum at about 740 nm to about 300 nm. In this range of IR wavelengths, the IR light is often subdivided into near-IR, mid-IR and far-IR sub-ranges. As the IR wavelengths increase, the IR light becomes less and less visible, or semi-visible, and even invisible, to the human eye. As used herein, the term "non-readily visible" light encompasses this entire range of IR wavelengths.

The housing can be configured as a handheld, portable scanner, a stand-mounted, stationary scanner, a vertical slot scanner, a flat-bed or horizontal slot scanner, a bi-optical, dual window scanner, or any like scanner. Each solid-state imager can be configured as a one- or two-dimensional charge coupled device (CCD) or a complementary metal oxide semiconductor (CMOS) device, and has a sensor array of photocells or light sensors (also known as pixels), and an imaging lens assembly for capturing return light from the indicia contained in a respective field of view of a respective imager, and for projecting the return light onto the respective imager to capture an image of the indicia. The first light source can be configured as one or more (red/white) light emitting diodes (LEDs), for illuminating the respective field of view with visible (red/white) illumination light. A typical red LED emits red light in a wavelength range of about 630 nm to about 720 nm. The second light source can be configured as one or more IR LEDs or IR lasers, for illuminating the respective field of view with infrared illumination light, or as a wider spectrum source in which visible light in addition to the IR light is emitted. The controller can be configured as a microprocessor operative for continuously or periodically energizing the light sources, for controlling the imagers for exposure at a frame rate, and for processing the signal generated by the imagers.

The use of non-readily visible IR light, instead of bright visible light, to illuminate one or more of the fields of view of the imagers, ameliorates the above-described irritating and bothersome adverse reaction to such bright visible light. Indeed, the more fields of view that are illuminated by the IR light, the less the irritation.

Yet, even though thermally printed indicia cannot be readily read when illuminated by IR light, as described above, this invention enables such thermally printed indicia to be read despite the use of the IR light, because this invention does not rely solely on IR light illumination. Each indicium is contained in more than one field of view. For example, two fields of views can intersect in a zone occupied by the indicia. One of these fields of view is illuminated by the visible light, and the other intersecting field of view is illuminated by the non-readily visible light. If the indicia is thermally printed on thermochromic paper, then the visible light illumination will render the thermally printed indicia readable. If the indicia is not thermally printed, then the visible or the non-readily visible light illumination will render the indicia readable.

Turning now to the drawings, FIG. 1 depicts an exemplary, dual window, bi-optical, point-of-transaction apparatus or workstation 10 used by retailers to process transactions involving the purchase of products bearing, or associated with, an identifying indicium or target, such as the illustrated UPC symbol 28 described above. Workstation 10 has a generally horizontal window 12 set flush with, or recessed into, a horizontal housing portion 14, and a vertical or generally vertical (referred to as "vertical" or "upright" hereinafter) window 16 set flush with, or recessed into, a raised housing portion 18 above the horizontal housing portion 14. The workstation can rest on a countertop or checkout counter as illustrated, or can be built into the countertop.

Figure 2:
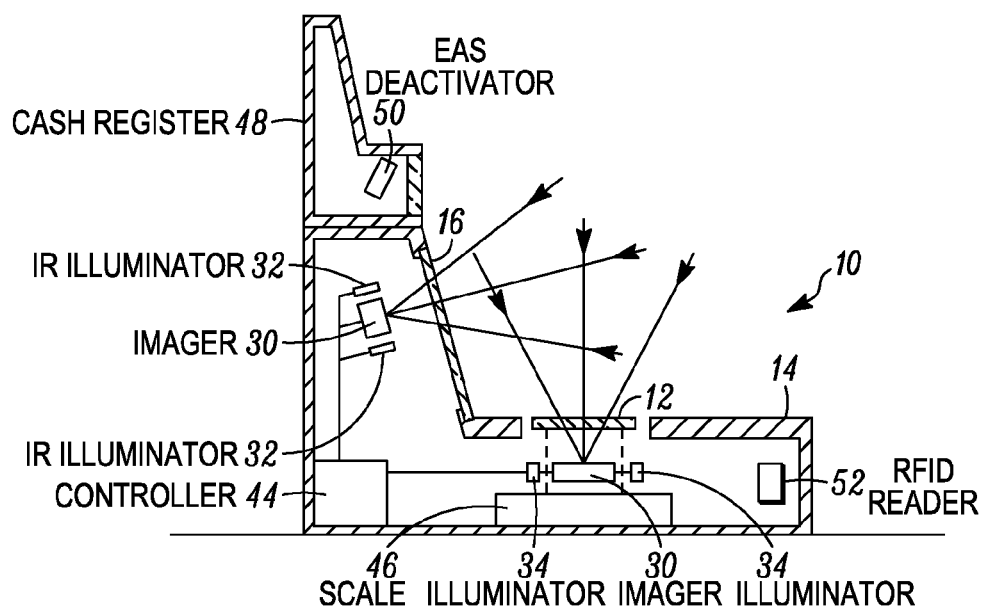
FIG. 2 is a part-sectional, part-diagrammatic, schematic view of a workstation analogous to that shown in FIG. 1.

As schematically shown in FIG. 2, a plurality of solid-state imaging sensors or imagers 30, each including an illumination assembly or illuminators 32, 34, are also mounted at the workstation 10, for capturing illumination light passing through either or both windows 12, 16 from the target symbol 28, which can, for example, be a one- or two-dimensional symbol. Each imager 30 is a solid-state linear or area array, preferably a CCD or CMOS array, of submegapixel or supramegapixel size. The illuminator 32 is preferably one or more infrared (IR) light sources, e.g., surface-mounted, light emitting diodes (LEDs) or IR lasers, located at one of the imagers 30, e.g., the one associated with the upright window 16, to uniformly illuminate the target symbol 28 with non-readily visible IR light, as described above. The illuminator 32 need not emit only IR light, but could be a wider spectrum source in which visible light in addition to the IR light is emitted. The illuminator 34 is preferably one or more visible (red/white) light sources, e.g., surface-mounted LEDs, located at another of the imagers 30, e.g., the one associated with the horizontal window 12, to uniformly illuminate the target symbol 28 with visible light, as also described above.

In use, an operator 24, such as a person working at a supermarket checkout counter, or a consumer in the case of self-checkout, processes a product 26 bearing the UPC symbol 28 thereon, past the windows 12, 16 by swiping the product 26 across a respective window 12, 16 in the abovementioned swipe mode, or by presenting the product 26 at a respective window 12, 16 in the abovementioned presentation mode. The symbol 28 may located on any of the top, bottom, right, left, front and rear, sides of the product, and at least one, and typically more, of the imagers 30 will capture the illumination light reflected, scattered, or otherwise returning from the symbol 28 through one or both windows 12, 16. The symbol 28 is typically contained in more than one field of view. For example, two fields of views from two imagers 30 can intersect in a zone occupied by the symbol 28. One of these fields of view is illuminated by the visible light from the visible LEDs 34 through the horizontal window 12, and the other intersecting field of view is illuminated by the non-readily visible IR light from the IR LEDs/lasers 32 through the upright window 16. The imagers 30 in FIG. 2 are preferably looking through the windows 12, 16 so that they can each see a side of the product 26 that is generally perpendicular to, as well as generally parallel to, a respective window 12, 16.

FIG. 2 also schematically depicts that a weighing scale 46, a cash register 48, and an electronic article surveillance (EAS) deactivator 50 are mounted at the workstation 10. The generally horizontal window 12 advantageously serves not only as a weighing platter for supporting a product to be weighed, but also allows the return illumination light to pass therethrough. The register 48 can sit atop the raised housing portion 18, or be integrated therewith. A radio frequency identification (RFID) reader 52 is also advantageously mounted at the workstation.

As also schematically shown in FIG. 2, the imagers 30 and their associated illuminators 32, 34 are operatively connected to a programmed microprocessor or controller 44 operative for controlling the operation of these and other components. Preferably, the microprocessor is the same as the one used for decoding the return light scattered from the target symbol 28 and for processing the captured target images.

In operation, the controller 44 sends successive command signals to the illuminators 32, 34 to continuously or periodically energize the illumination LEDs for a short time period of 300 microseconds or less, and activates the imagers 30 to collect light from the target 28 only during said time period, also known as the exposure time period. By acquiring a target image during this brief time period, the image of the target 28 is not excessively blurred even in the presence of relative motion between the imagers and the target 28.

As previously stated, FIG. 2 is only a schematic representation of an all imager-based reader as embodied in a bi-optical workstation. Other housings having different shapes, with one or more windows, are also within the spirit of this invention. A practical depiction of a bi-optical workstation in accordance with this invention is shown in FIGS. 3-4, in which all the imagers, now relabeled 1, 2, 3, 4, 5, and 6, and, optionally, their illuminators 32, 34, as well as other electrical components, as described below, are commonly mounted on a printed circuit board 54 for joint installation at, and joint removal from, the workstation 10 for ease of serviceability.

Figure 3:
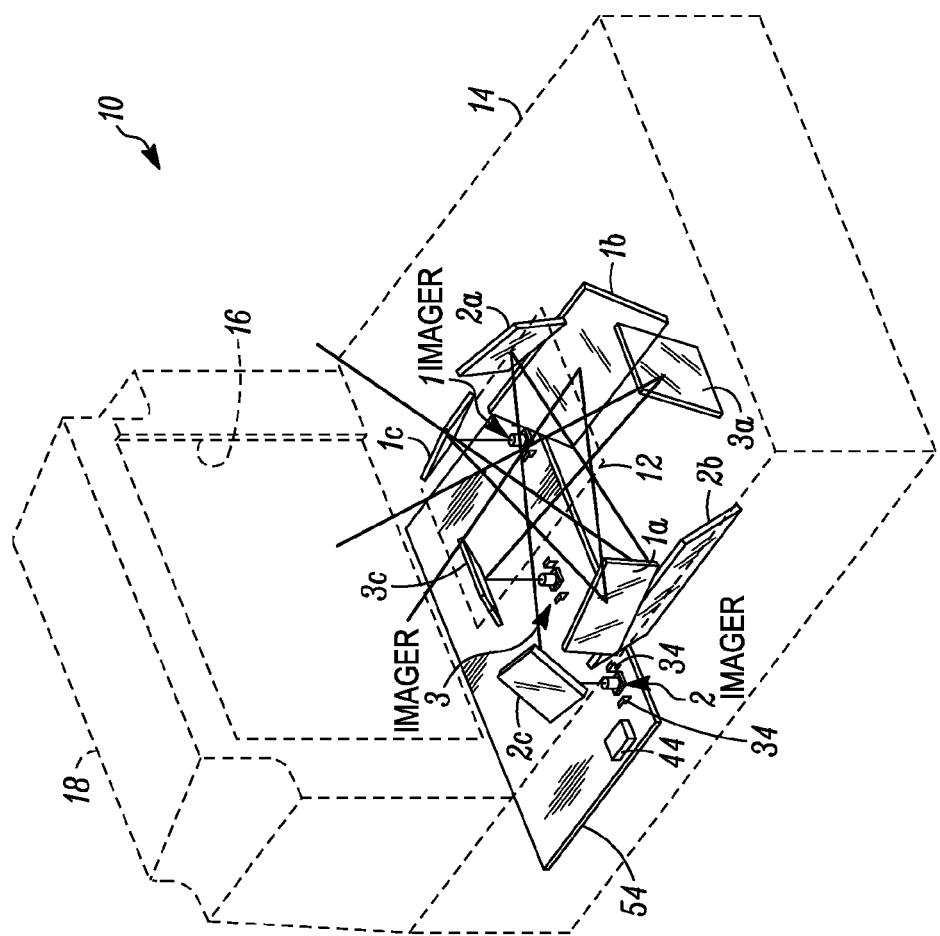
FIG. 3 is a perspective view of a trio of imagers looking through a generally horizontal window of the workstation of FIG. 1 in dashed lines.
Figure 4:
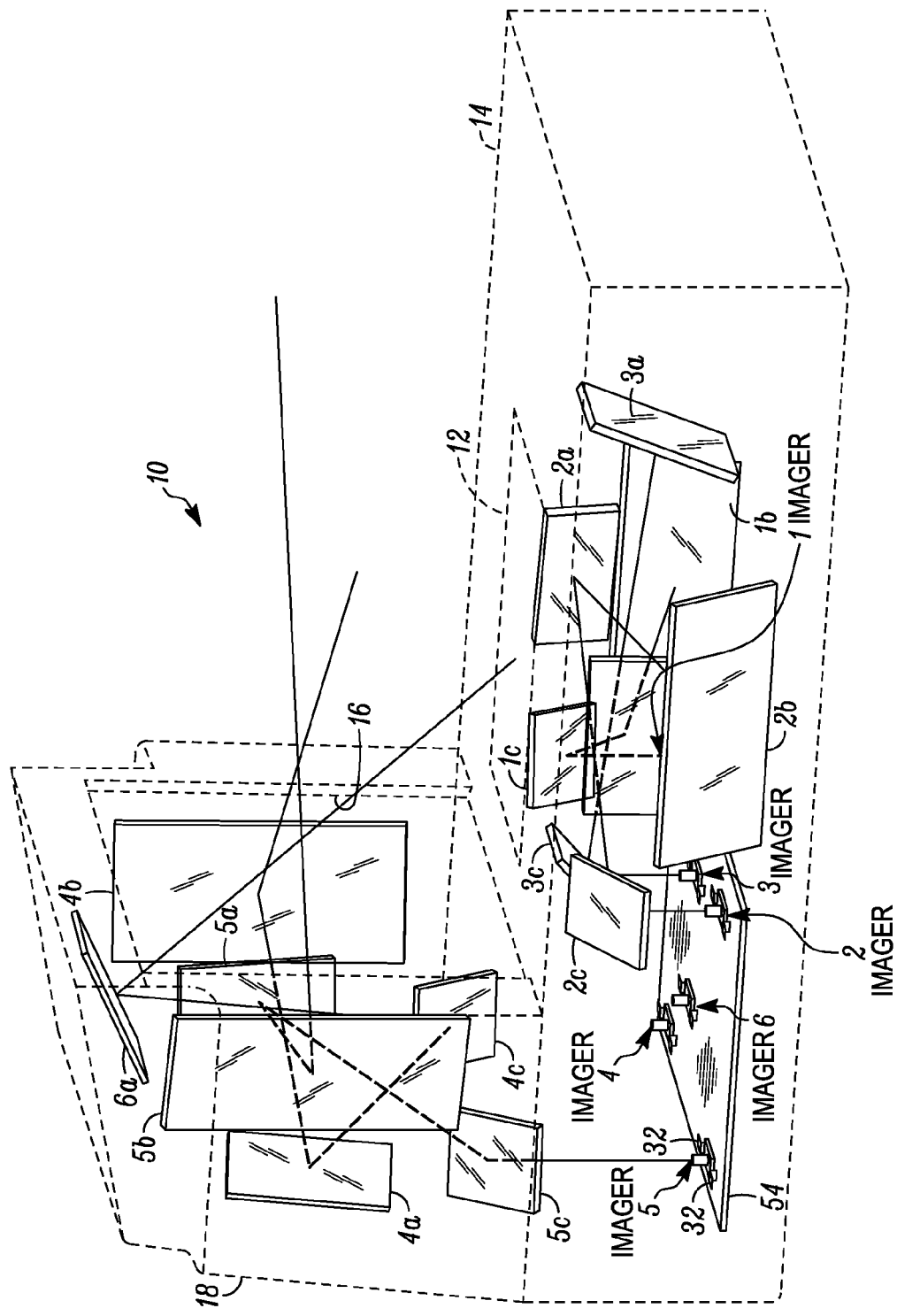
FIG. 4 is a perspective view of the trio of imagers of FIG. 3, together with another trio of imagers looking through an upright window of the workstation of FIG. 1 in dashed lines.

As shown in FIG. 3, the board 54 lies in a generally horizontal plane generally parallel to, and below, the generally horizontal window 12, and imager 1 faces generally vertically upward toward an inclined folding mirror 1c directly overhead at a right side of the window 12. The folding mirror 1c faces another inclined narrow folding mirror 1a located at a left side of the window 12. The folding mirror 1a faces still another inclined wide folding mirror 1b adjacent the mirror 1c. The folding mirror 1b faces out through the generally horizontal window 12 toward the left side of the workstation.

Imager 2 and its associated optics is mirror symmetrical to imager 1 and its associated optics. Imager 2 faces generally vertically upward toward an inclined folding mirror 2c directly overhead at the left side of the window 12. The folding mirror 2c faces another inclined narrow folding mirror 2a located at the right side of the window 12. The folding mirror 2a faces still another inclined wide folding mirror 2b adjacent the mirror 2c. The folding mirror 2b faces out through the generally horizontal window 12 toward the right side of the workstation.

Imager 3 and its associated optics are located generally centrally between imagers 1 and 2 and their associated optics. Imager 3 faces generally vertically upward toward an inclined folding mirror 3c directly overhead generally centrally of the window 12 at one end thereof. The folding mirror 3c faces another inclined folding mirror 3a located at the opposite end of the window 12. The folding mirror 3a faces out through the window 12 in an upward direction toward the raised housing portion 18.

As described so far, a trio of imagers 1, 2 and 3 capture light along different, intersecting fields of view along different directions through the generally horizontal window 12. Each of these three fields of view is illuminated with visible light from the visible LEDs 34. Turning now to FIG. 4, an additional trio of imagers 4, 5 and 6 capture light along different, intersecting fields of view along different directions through the generally vertical window 16. Each of these three additional fields of view is illuminated with non-readily visible light from the IR LEDs/lasers 32.

More particularly, imager 4 faces generally vertically upward toward an inclined folding mirror 4c directly overhead at a right side of the window 16. The folding mirror 4c faces another inclined narrow folding mirror 4a located at a left side of the window 16. The folding mirror 4a faces still another inclined wide folding mirror 4b adjacent the mirror 4c. The folding mirror 4b faces out through the generally vertical window 16 toward the left side of the workstation.

Imager 5 and its associated optics is mirror symmetrical to imager 4 and its associated optics. Imager 5 faces generally vertically upward toward an inclined folding mirror 5c directly overhead at the left side of the window 16. The folding mirror 5c faces another inclined narrow folding mirror 5a located at the right side of the window 16. The folding mirror 5a faces still another inclined wide folding mirror 5b adjacent the mirror 5c. The folding mirror 5b faces out through the generally vertical window 16 toward the right side of the workstation.

Imager 6 and its associated optics are located generally centrally between imagers 4 and 5 and their associated optics. Imager 6 faces generally vertically upward toward an inclined folding mirror 6a directly overhead generally centrally of the window 16 at an upper end thereof. The folding mirror 6a faces out through the window 16 in a downward direction toward the countertop 14.

The preferred embodiment shown is for a six-sided reader. Six-sided reading, or six fields of view, is most commonly used in supermarkets. Department stores and mass merchandisers, however, often use bi-optical readers, but do not need a six-sided scanning capability. A less expensive imaging bi-optical reader can be created for department stores and mass merchandisers by eliminating one of more imagers. For example, elimination of imagers 3 and 6 will still provide performance adequate for the needs of many department stores.

Each imager array preferably has a global shutter so that the captured images will not be disturbed by motion of the target symbol 28 relative to the window(s) during the exposure time period. The target symbol 28 can be presented or swiped at speeds up to around 100 inches per second across any part of either window. For an imager to be able to read a target symbol 28 that is moving rapidly, the target symbol 28 must be illuminated over a short exposure time.

In the preferred embodiment, as noted above, each imager 30 has an associated set of visible LEDs 34 or IR LEDs/lasers 32 that illuminate the various fields of view. Each illuminator includes lenses (not shown) that concentrate the illumination light of each illuminator into a solid angle that approximately matches each field of view of each imager 30. The illumination for each imager 30 is reflected off of the same folding mirrors as the respective field of view of its associated imager 30.

The symbol 28 may located on any of the top, bottom, right, left, front and rear, sides of the product, and at least one, and typically more, of the imagers 30 will capture the illumination light reflected, scattered, or otherwise returning from the symbol 28 through one or both windows 12, 16. The symbol 28 is typically contained in more than one field of view. For example, two fields of views from two imagers 30 can intersect in a zone occupied by the symbol 28. One of these fields of view is illuminated by the visible light from the visible LEDs 34 through the horizontal window 12, and the other intersecting field of view is illuminated by the non-readily visible IR light from the IR LEDs/lasers 32 through the upright window 16.

The use of non-readily visible IR light, instead of bright visible light, to illuminate one or more of the fields of view of the imagers, or even a part of a field of view, ameliorates the above-described irritating and bothersome adverse reaction to such bright visible light. Indeed, the more fields of view that are illuminated by the IR light, the less the irritation.

Yet, even though thermally printed indicia (typically printed in blue ink) cannot be readily read when illuminated by IR light, as described above, this invention enables such thermally printed indicia to be read despite the use of the IR light, because this invention does not rely solely on IR light illumination. If the indicia is thermally printed on thermochromic paper, then the visible light illumination will render the thermally printed indicia readable. If the indicia is not thermally printed, then the visible or the non-readily visible light illumination will render the indicia readable.

In accordance with another feature of this invention, a method of electro-optically reading indicia is performed by looking at each indicium with a plurality of solid-state imagers over a plurality of fields of view, illuminating the indicia by emitting non-readily visible illumination light with a first light source to illuminate at least one of the fields of view in which a respective indicium is contained, and by emitting visible illumination light with a second light source to illuminate at least another of the fields of view in which the respective indicium is contained, capturing at least one of the non-readily visible illumination light and the visible illumination light returning from the respective illuminated indicium, generating a signal corresponding to the respective illuminated indicium, energizing at least one of the light sources to emit the illumination light, controlling at least one of the imagers to capture the returning illumination light, and processing the signal to read the respective illuminated indicium.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

For example, the IR light need not be emitted through the upright window 16, but could be emitted through the horizontal window 12. Also, when plural imagers are used to capture light through a respective window, one or more of the associated illuminators can emit IR light, while the other illuminators associated with that same window can emit visible light. In other words, not all of the illuminators associated with a particular window need be associated with illuminators that emit light of the same wavelength, but different light wavelengths can be employed.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A workstation for electro-optically reading indicia, comprising:
   a housing for supporting a generally horizontal light-transmissive window, and an upright light-transmissive window extending above the generally horizontal plane;
   a first plurality of solid-state imagers supported by the housing, and operative for receiving light from each indicium through the generally horizontal window over a plurality of first fields of view;
   a second plurality of solid-state imagers supported by the housing, and operative for receiving light from each indicium through the upright window over a plurality of second fields of view, each imager including a sensor array of photocells for capturing return light from each indicium over a respective field of view of said imager;
   an illumination assembly supported by the housing, and operative for illuminating the indicia, the illumination assembly including a plurality of first energizable light sources for emitting non-readily visible illumination light through a respective window to illuminate at least one of the first and second fields of view in which a respective indicium is contained, and a plurality of second energizable light sources for emitting visible illumination light through a respective window to illuminate at least another of the first and second fields of view in which the respective indicium is contained;
   at least one of the imagers is further operative for capturing image elements of the respective indicium with the sensor array of photocells therein while the respective indicium is illuminated by the non-readily visible illumination light, and for generating a signal corresponding to the respective illuminated indicium; and
   a controller for energizing the light sources to emit the illumination light, for controlling the imagers to capture the returning illumination light, and for processing the signal to read the respective illuminated indicium.

2. The workstation of claim 1, wherein each first light source is operative for emitting the non-readily visible illumination light as infrared light.

3. The workstation of claim 2, wherein each first light source is operative for emitting visible illumination light in addition to the infrared light.

4. The workstation of claim 1, wherein the controller is operative for continuously energizing the light sources.

5. The workstation of claim 1, wherein the controller is operative for periodically energizing the light sources.

6. A method of electro-optically reading indicia, comprising:
   receiving light from each indicium with a plurality of solid-state imagers over a plurality of fields of view, each imager including a sensor array of photocells for capturing return light from each indicium over a respective field of view of said imager;
   illuminating the indicia, by emitting non-readily visible illumination light with a first light source to illuminate at least one of the fields of view in which a respective indicium is contained, and by emitting visible illumination light with a second light source to illuminate at least another of the fields of view in which the respective indicium is contained;
   capturing image elements of the respective indicium with the sensor array of photocells in an imager while the respective indicium is illuminated by the non-readily visible illumination light;
   generating a signal corresponding to the respective illuminated indicium; energizing at least one of the light sources to emit the illumination light; controlling at least one of the imagers to capture the returning illumination light;
   processing the signal to read the respective illuminated indicium; and
   wherein the receiving, illuminating and capturing are performed through a generally horizontal light-transmissive window lying in a generally horizontal plane, and through an upright light-transmissive window extending above the generally horizontal plane.

7. The method of claim 6, wherein the non-readily visible illumination light emitted from the first light source is configured as infrared light.

8. The method of claim 7, wherein visible illumination light in addition to the infrared light is emitted from the first light source.

9. The method of claim 6, wherein the light sources are continuously energized.

10. The method of claim 6, wherein the light sources are periodically energized.

* * * * *